United States Patent
Wachter et al.

(10) Patent No.: US 9,900,860 B2
(45) Date of Patent: Feb. 20, 2018

(54) POSITIONING PROTOCOL, POSITIONING CAPABILITY AND POSITION METHOD IDENTIFICATION IN SUPL

(71) Applicant: QUALCOMM Incorporated, San Diego, CA (US)

(72) Inventors: Andreas Klaus Wachter, Menlo Park, CA (US); Stephen William Edge, Escondido, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 15/186,143

(22) Filed: Jun. 17, 2016

(65) Prior Publication Data
US 2017/0251502 A1    Aug. 31, 2017

Related U.S. Application Data

(60) Provisional application No. 62/300,462, filed on Feb. 26, 2016.

(51) Int. Cl.
*H04W 64/00*    (2009.01)
*G01S 5/00*    (2006.01)
(Continued)

(52) U.S. Cl.
CPC ......... *H04W 64/003* (2013.01); *G01S 5/0009* (2013.01); *H04L 29/06537* (2013.01); *H04L 63/205* (2013.01); *H04L 69/24* (2013.01); *H04W 4/02* (2013.01); *H04W 4/20* (2013.01); *H04W 28/16* (2013.01); *H04W 12/08* (2013.01); *H04W 76/02* (2013.01)

(58) Field of Classification Search
CPC ..... H04W 64/003; H04W 28/16; H04W 4/02; H04W 4/20; H04W 12/08; H04W 76/02; H04W 8/12; H04W 8/14; H04W 8/16; H04L 69/24; H04L 63/205; H04L 29/06537; G01S 5/00; G01S 5/0009; G01S 5/0018–5/0063
See application file for complete search history.

(56) References Cited

U.S. PATENT DOCUMENTS

2010/0311438 A1*  12/2010  Edge .................. H04W 4/02
455/456.1
2011/0249623 A1  10/2011  Wachter et al.
(Continued)

OTHER PUBLICATIONS

International Search Report and Written Opinion—PCT/US2017/013727—ISA/EPO—Mar. 22, 2017—15 pgs.
(Continued)

Primary Examiner — Joshua Kading
(74) Attorney, Agent, or Firm — Hunter Clark PLLC

(57) ABSTRACT

A method includes: receiving a request at a Secure User Plane Location (SUPL) Location Platform (SLP) for location-related service; producing a positioning method SUPL message that includes a posmethod parameter that includes a positioning protocol indicator indicating that SET capability transfer and positioning method selection are to be conducted in a positioning protocol layer; and sending the positioning method SUPL message from the SLP to a SUPL Enabled Terminal (SET) using a SUPL User Plane Location Protocol (ULP).

26 Claims, 7 Drawing Sheets

(51) Int. Cl.
*H04L 29/06* (2006.01)
*H04W 28/16* (2009.01)
*H04W 4/02* (2018.01)
*H04W 4/20* (2018.01)
*H04W 12/08* (2009.01)
*H04W 76/02* (2009.01)

(56) References Cited

U.S. PATENT DOCUMENTS

| | | | |
|---|---|---|---|
| 2011/0256875 A1* | 10/2011 | Edge | H04W 4/02 |
| | | | 455/440 |
| 2012/0202517 A1 | 8/2012 | Edge et al. | |
| 2013/0217415 A1* | 8/2013 | Edge | H04W 4/02 |
| | | | 455/456.2 |
| 2014/0080523 A1* | 3/2014 | Burroughs | H04W 4/02 |
| | | | 455/456.3 |

OTHER PUBLICATIONS

Open Mobile Alliance (oma): "User Plane Location Protocol Open Mobile Alliance". Candidate Version 3.0, Sep. 16, 2014 (Sep. 16, 2014), XP055354820, 293 pages. Retrieved from the Internet: URL: http://www.openmobilealliance.org/release/SUPL/V3_0-20140916-C/OMA-TS-ULP-V3_0-20140916-C.pdf.

* cited by examiner

POSITIONING PROTOCOL, POSITIONING CAPABILITY AND POSITION METHOD IDENTIFICATION IN SUPL

CROSS-REFERENCE TO RELATED APPLICATIONS

This application claims the benefit of U.S. Provisional Application No. 62/300,462, filed Feb. 26, 2016, entitled "POSITIONING PROTOCOL, POSITIONING CAPABILITY AND POSITION METHOD IDENTIFICATION IN SUPL," which is assigned to the assignee hereof and the entire contents of which are hereby incorporated herein by reference.

BACKGROUND

It is often desirable to know the location or position of a wireless device in a network, with the terms "location" and "position" being synonymous and used interchangeably herein. For example, a user may utilize a wireless device to browse through a website and may click on location-sensitive content. A web server may respond to this click by querying the network for the position of the wireless device. The network may initiate position processing with the wireless device in order to ascertain the position of the wireless device. The network may return a position estimate for the wireless device to the web server, which may use this position estimate to provide appropriate content to the user. There are many other scenarios in which knowledge of the position of a wireless device may be useful such as when a user of the wireless device instigates an emergency call, needs directions to move to a different location or needs to be located or tracked by another authorized user.

A message flow (which may also be called a call flow or a procedure) is typically executed in order to obtain a position estimate for a wireless device and to send this position estimate to an external client entity, e.g., a web server. Various messages are typically exchanged between one or more network entities, the wireless device, and the external client entity for the message flow. These messages ensure that each entity is provided with pertinent information, or can obtain this information from another entity, in order to carry out positioning for the wireless device and/or deliver the position estimate to the client entity.

One commonly used solution for location based services is known as Secure User Plane Location (SUPL) as defined by the Open Mobile Alliance (OMA). With the SUPL solution, a wireless device, known as a SUPL Enabled Terminal (SET), and a location server, known as a SUPL Location Platform (SLP), interact using the SUPL User Plane Location Protocol (ULP) to obtain the location of the SET on behalf of the SET and/or SLP. Obtaining the location of the SET typically includes identifying one or more than one position method by the SLP, identifying a positioning protocol that will enable information related to the identified position method(s) to be exchanged between the SET and SLP, and identifying positioning capabilities of the SET that may be applicable to the identified positioning protocol and/or identified position method(s).

SUMMARY

An example server includes: a transceiver configured to send messages to a Secure User Plane Location (SUPL) Enabled Terminal (SET) and to receive messages from the SET; and a processor communicatively coupled to the transceiver and configured to produce and send a positioning method SUPL message to the SET via the transceiver using a SUPL User Plane Location Protocol (ULP); where the positioning method SUPL message includes a posmethod parameter; and where the posmethod parameter includes a positioning protocol indicator indicating that SET capability transfer and positioning method selection are to be conducted in a positioning protocol layer.

Implementations of such a server may include one or more of the following features. The processor is configured to respond to the processor sending the positioning method SUPL message with the positioning protocol indicator by ignoring SUPL ULP information from the SET indicating SET capability information. The processor is configured to send the positioning method SUPL message including the positioning protocol indicator as part of a SUPL INIT message, a SUPL RESPONSE message, or a SUPL TRIGGERED RESPONSE message. The processor is configured to produce and send to the SET a specified-data SUPL message using SUPL ULP that indicates that specified data that are to be transferred between the server and the SET in the positioning protocol layer only. The specified data are positioning data. The processor is configured to send the positioning method SUPL message and the specified-data SUPL message in a single message. The positioning protocol indicator specifies a positioning protocol.

An example method includes: receiving a request at a Secure User Plane Location (SUPL) Location Platform (SLP) for location-related service; producing a positioning method SUPL message, wherein the positioning method SUPL message includes a posmethod parameter, and wherein the posmethod parameter includes a positioning protocol indicator indicating that SET capability transfer and positioning method selection are to be conducted in a positioning protocol layer; and sending the positioning method SUPL message from the SLP to a SUPL Enabled Terminal (SET) using a SUPL User Plane Location Protocol (ULP).

Implementations of such a method may include one or more of the following features. The method further includes: receiving, at the SLP, a responsive SUPL ULP message from the SET responsive to the positioning method SUPL message, the responsive SUPL ULP message including SET capability information; and ignoring, by the SLP, the SET capability information in the responsive SUPL ULP message in response to sending the positioning method SUPL message including the posmethod parameter including the positioning protocol indicator. The positioning method SUPL message is one of a SUPL INIT message, a SUPL RESPONSE message, or a SUPL TRIGGERED RESPONSE message. The method further includes sending a specified-data SUPL message to the SET, using SUPL ULP, indicating specified data that are to be transferred between the SLP and the SET in the positioning protocol layer only. The specified data are positioning data. Sending the positioning method SUPL message and sending the specified-data SUPL message comprise sending a single message. The positioning protocol indicator specifies a positioning protocol.

An example Secure User Plane Location (SUPL) Enabled Terminal (SET) includes: a transceiver configured to send messages to a SUPL Location Platform (SLP) and to receive messages from the SLP; and a processor communicatively coupled to the transceiver and configured to: receive a positioning method SUPL message, in a SUPL User Plane Location Protocol (ULP), from the SLP via the transceiver; determine that the positioning method SUPL message includes a posmethod parameter that includes a positioning protocol indicator; and in response to the positioning protocol indicator indicating that SET capability transfer and positioning method selection are to be conducted in a positioning protocol layer: provide SET capability information to the SLP using the positioning protocol layer; and interact with the SLP to select a positioning method using the positioning protocol layer.

Implementations of such a SET may include one or more of the following features. The positioning method SUPL message is one of a SUPL INIT message, a SUPL RESPONSE message, or a SUPL TRIGGERED RESPONSE message. The processor is configured to: receive a specified-data SUPL message from the SLP indicating specified data that are to be transferred from the SET to the SLP in the positioning protocol layer only; and send the specified data to the SLP using only the positioning protocol layer in response to receiving the specified-data SUPL message. The specified data are positioning data. The processor is configured to receive the positioning method SUPL message and the specified-data SUPL message as a single message. The positioning protocol indicator indicates a specified positioning protocol and the processor is configured to use the specified positioning protocol to provide the SET capability information to the SLP and to interact with the SLP to select the positioning method.

Another example method includes: receiving a positioning method Secure User Plane Location (SUPL) message from a SUPL Location Platform (SLP); determining that the positioning method SUPL message includes a posmethod parameter that includes a positioning protocol indicator indicating that SET capability transfer and positioning method selection are to be conducted in a positioning protocol layer; in response to the positioning protocol indicator indicating that SET capability transfer and positioning method selection are to be conducted in a positioning protocol layer, providing SET capability information to the SLP using the positioning protocol layer; and interacting with the SLP to select a positioning method using the positioning protocol layer in response to the positioning method SUPL message including the posmethod parameter including the positioning protocol indicator.

Implementations of such a method may include one or more of the following features. The positioning method SUPL message is one of a SUPL INIT message, a SUPL RESPONSE message, or a SUPL TRIGGERED RESPONSE message. The method further includes: receiving a specified-data SUPL message from the SLP indicating specified data that are to be transferred from the SET to the SLP in the positioning protocol layer only; and sending the specified data to the SLP using only the positioning protocol layer in response to receiving the specified-data SUPL message. The specified data are positioning data. Receiving the positioning method SUPL message and the specified-data SUPL message comprise receiving a single message. The positioning protocol indicator indicates a specified positioning protocol and wherein providing the SET capability information to the SLP and interacting with the SLP to select the positioning method each comprise using the specified positioning protocol.

DETAILED DESCRIPTION

Figure 1:
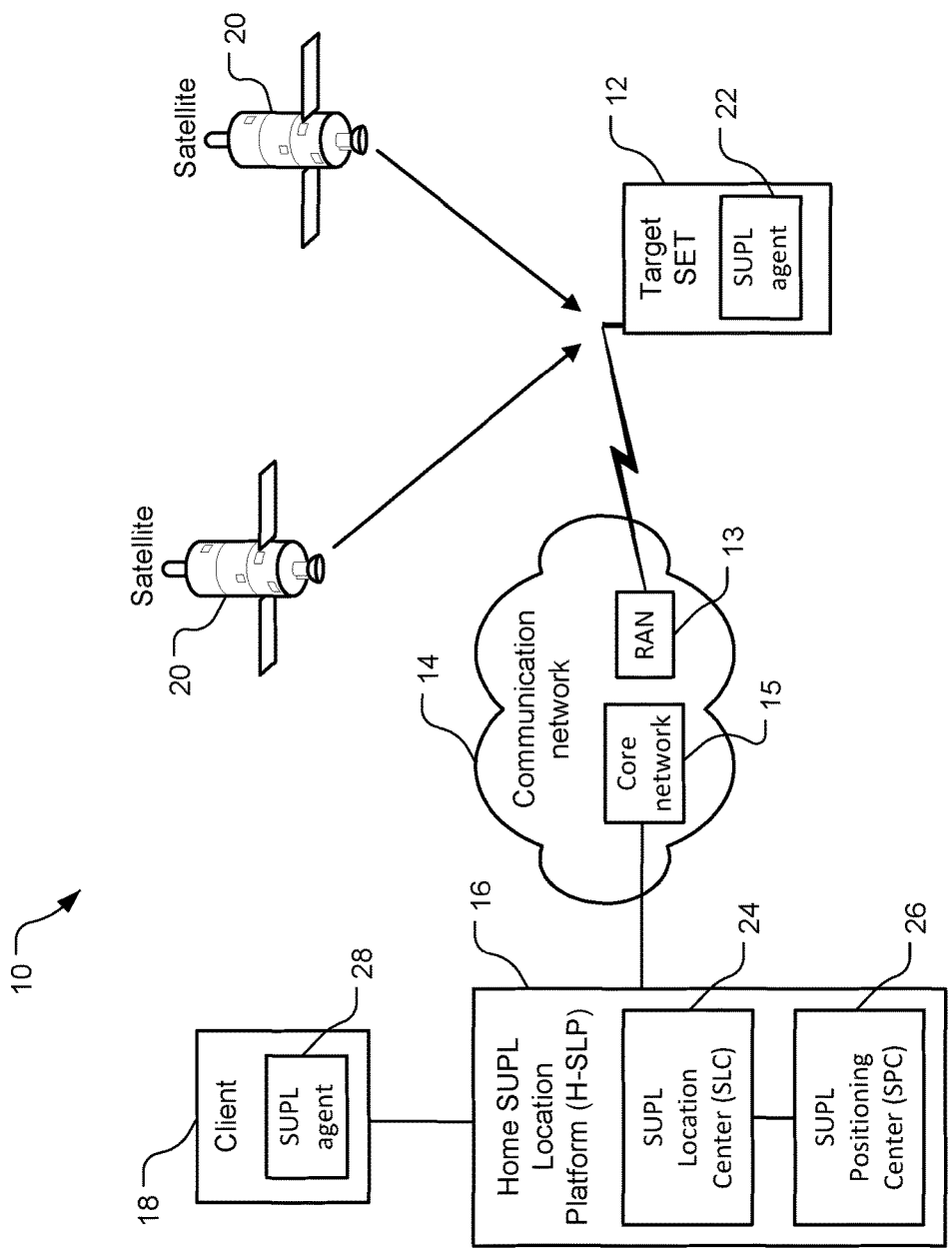
FIG. 1 is a simplified diagram of a network architecture.

Techniques are discussed for identifying a positioning protocol (also referred to as a position protocol), position methods (also referred to as positioning methods) and positioning capabilities (also referred to as position capabilities) using SUPL. One or more of the techniques may improve the efficiency, accuracy and/or flexibility of position method, positioning protocol and/or positioning capability identification and/or may be useful to simplify SET and/or SLP implementation and/or to improve location reliability and accuracy. In a first technique, an SLP may indicate to a SET that position methods will be identified (also referred to here as being selected) using a positioning protocol with messages for the positioning protocol carried (or embedded) inside SUPL ULP messages. In a second technique, an SLP may indicate to a SET that positioning capabilities (e.g. for the SET and/or the SLP) will be identified (also referred to here as being transferred) using a positioning protocol with messages for the positioning protocol carried (or embedded) inside SUPL ULP messages. In a third technique, an SLP may identify to a SET a particular positioning protocol or a combination of positioning protocols that will be used for a positioning session between the SLP and the SET with messages for the particular positioning protocol or particular combination of positioning protocols carried (or embedded) inside SUPL ULP messages. In some embodiments, two or more of the first, second and third techniques may be combined. As an example of combining the first and the second techniques, an SLP may instruct a target SET that SET positioning capability transfer to the SLP and selection of a position method or position methods are to be performed by a positioning protocol, which may also be referred to as a positioning protocol layer.

As an example of combining the first, the second and the third techniques referred to previously, the SLP may indicate to the SET the particular positioning protocol (or positioning protocol layer) in which the SET positioning capabilities will be transferred and the position method(s) will be selected. In some embodiments of the first, second and/or third techniques, the SLP can send a ULP posmethod parameter (also referred to as a positioning method parameter) that includes a positioning protocol indicator instead of a selected position method. The positioning protocol indicator may indicate to the SET that: (i) the position method will be selected in a positioning protocol layer (first technique); (ii) the SET positioning capabilities will be transferred to the SLP in the positioning protocol layer (second technique); (iii) a particular positioning protocol or positioning protocols will be used for the positioning protocol layer (third technique); or (iv) some combination of (i), (ii) and (iii) will be used (combination of techniques). In the case that (ii) (second technique) is indicated, the target SET may respond to receiving the positioning protocol indicator in the posmethod parameter by sending dummy information or no information in the SET capabilities parameter (also referred to as a field) of a ULP response to the SLP to satisfy the ULP protocol. The SLP can then ignore the SET capabilities parameter received from the SET and any capability information that it includes. Also or alternatively, other examples and/or features are possible.

A possible advantage of the first technique, whereby a position method or position methods are selected in a positioning protocol layer, is that hybrid positioning methods (e.g., combinations of positioning methods) may be selected using a positioning protocol message embedded in a SUPL message. When the first technique is not used and a position method is selected by an SLP using the SUPL ULP protocol (e.g. ULP posmethod parameter), it may not be possible to select hybrid position methods with much flexibility because the number of distinct hybrid position methods may be high (e.g. more than one thousand) due to the possibility of combining individual position methods in a hybrid manner in many different ways. As an example, if there are 10 different position methods, there could be as many as $2^{10}-11$ (=1013) distinct hybrid combinations containing two or more of these methods. In the SUPL ULP protocol, the posmethod parameter is restricted to indicating one specific position method or one specific combination of position methods which the SLP indicates to the SET is to be used for a SUPL session. This makes selection of any hybrid combination awkward because the posmethod parameter would need to have a different value assigned for each possible hybrid combination (e.g. which could be as many as 1013 in the previous example). In addition, because the SLP may not know in advance which position methods a SET supports, selecting a particular position method or a particular combination of position methods in advance using the posmethod ULP parameter may not always be feasible. Instead, positioning method selection may be more flexibly and more feasibly performed by a positioning protocol layer instead of a SUPL ULP layer. Using the techniques described herein, an SLP can switch from a SUPL ULP layer based SET capability transfer and/or positioning method selection to positioning protocol layer based SET capability transfer and/or positioning method selection. Other capabilities may be provided and not every implementation according to the disclosure must provide any, let alone all, of the capabilities discussed. Further, it may be possible for an effect noted herein to be achieved by means other than that noted, and a noted item/technique may not necessarily yield the noted effect.

User Plane location based service solutions, such as Secure User Plane Location (SUPL), may employ multiple positioning protocols (e.g., LPP, LPPe, TIA-801, etc.) for positioning. A positioning protocol is a protocol used between a server (e.g., an SLP) and a terminal or other device (e.g., a SET) that supports one or more positioning methods that are able to determine or help determining the location of the terminal or device. Examples of positioning protocols include the Long Term Evolution (LTE) Positioning Protocol (LPP) defined in 3GPP Technical Specification (TS) 35.355, LPP Extensions (LPPe) defined in OMA-TS-LPPe-V1_0, OMA-TS-LPPe-V1_1 and OMA-TS-LPPe-V2_0 from the Open Mobile Alliance (OMA), TIA-801 defined in 3GPP2 TS C.S0022, Radio Resource Control (RRC) defined in 3GPP TS 25.331 and Radio Resource Location Services (LCS) Protocol (RRLP) defined in 3GPP TS 44.031. These specifications are all publicly available from the Third Generation Partnership Project (3GPP), Third Generation Partnership Project 2 (3GPP2) and OMA as applicable.

LPPe is defined to be used in combination with LPP and the combined protocol may be referred to as LPP/LPPe, LPP+LPPe or simply as LPPe (where combination with LPP is assumed implicitly). Use of a positioning protocol between a server and a device may require a selection mechanism in order to be able to invoke a positioning protocol supported by both the location server and the target device. Without a selection mechanism, the location server and target device may not be able to conduct a positioning session or may not be able to conduct a positioning session efficiently in cases where the location server does not support the positioning protocol selected by the target client and vice versa. As a result, a User Plane (e.g. SUPL) positioning session between a target device (e.g. SET) and a location server (e.g. SLP) may need to be aborted and either may not be restarted resulting in a failed location attempt or may be restarted with a different positioning protocol resulting in successful location but with delays and wasted network resources. To overcome this limitation, the third technique referred to above could be used wherein the server (e.g. SLP) indicates a specific preferred positioning protocol to a device (e.g. a SET) at the start of a User Plane (e.g. SUPL) positioning session or indicates two or more alternative preferred positioning protocols to the device. In an embodiment when SUPL is used, the indication could be conveyed using the ULP posmethod parameter in which one or more parameter values are assigned that each indicate a particular preferred positioning protocol or two or more alternative preferred positioning protocols.

The techniques described herein may be used for positioning of devices (e.g. SETs) that have access to various wireless networks such as Code Division Multiple Access (CDMA) networks, Time Division Multiple Access (TDMA) networks, Frequency Division Multiple Access (FDMA) networks, Orthogonal FDMA (OFDMA) networks, networks supporting a combination of the aforementioned technologies, networks with wireless wide area network (WWAN) coverage and/or wireless local area network (WLAN) coverage, a wireless personal area network (WPAN). A CDMA network may implement one or more radio access technologies (RATs) such as Wideband-CDMA (W-CDMA), cdma2000, and so on. Cdma2000 covers Telecommunications Industry Association (TIA) IS-2000, IS-856, and IS-95 standards. A TDMA network may implement one or more radio technologies such as Global System for Mobile Communications (GSM), Digital Advanced Mobile Phone System (D-AMPS) or some other RAT. D-AMPS covers TIA IS-136 and IS-54 standards. An OFDMA network may implement one or more radio technologies such as Long Term Evolution (LTE) or LTE Advanced (LTE-A). These various radio technologies and standards are known in the art. LTE, LTE-A, W-CDMA and GSM are described in documents from an organization named "3rd Generation Partnership Project" (3GPP). Cdma2000 is described in documents from an organization named "3rd Generation Partnership Project 2" (3GPP2). 3GPP and 3GPP2 documents are publicly available. A WLAN may be an Institute of Electrical and Electronics Engineers (IEEE) 802.11x network, and a WPAN may be a Bluetooth® network, an IEEE 802.15x network, or some other type of network. The techniques may also be implemented in conjunction with any combination of WWAN, WLAN and/or WPAN. The techniques may also be used to help locate a device communicating using a wireline IP capable network such as a network providing Digital Subscriber Line (DSL) or cable access and/or may be used to support client devices communicating using a wireline network.

The techniques may also be used for various location solutions such as user plane solutions. A user plane is a mechanism for carrying data for higher-layer applications and employing a user-plane bearer, which is typically implemented with protocols such as User Datagram Protocol (UDP), Transmission Control Protocol (TCP), and Internet Protocol (IP), all of which are known in the art. Messages (e.g. SUPL ULP messages) supporting location services and positioning are carried as part of data in a user plane solution. The techniques may be used for Secure User Plane Location (SUPL) and pre-SUPL architectures promulgated by the Open Mobile Alliance (OMA), a 3GPP2 user plane architecture described in 3GPP2 TS X.S0024, and so on. For clarity, the techniques are described in detail herein for Secure User Plane Location (SUPL).

Referring to FIG. 1, an example of a network architecture 10 capable of providing location services for SUPL enabled terminals (SETs) includes a target SET 12, a communication network 14, a Home SUPL Location Platform (H-SLP) 16, an external client 18 (referred to as a client 18 herein), and satellites 20. A SET is a device capable of communicating with SUPL capable entities that support positioning and location services for SETs. For simplicity, only one target SET 12 is shown in FIG. 1. The SET 12 may be stationary or mobile and may also be called a mobile station (MS), a user equipment (UE), a terminal, a station, a device, a mobile device, a wireless device, a subscriber unit, a target, a target SET, or some other terminology. The SET 12 may be a cellular phone, a personal digital assistant (PDA), a wireless modem, a personal computer, a laptop computer, a telemetry device, a tracking device, a smartphone, a tablet, a machine to machine (M2M) device, an embedded modem, and so on. For example, the SET 12 may be a UE in Universal Mobile Telecommunication System (UMTS), an MS in GSM or cdma2000, a personal computer in an IP-based network, and so on. The communication network 14 includes a core network 15, which may be is a wired (terrestrial) communication network, and a Radio Access Network (RAN) 13, which may be a wireless communication network employing one or more wireless carriers (e.g., LTE).

The SET 12 includes a SUPL agent 22 which may be an application (App) or other client entity within the SET 12 that may, from time to time, request the location of the SET 12 from the SET 12—e.g. from a positioning engine in SET 12 (not shown in FIG. 1) that supports SUPL. The target SET 12 is a SET whose position is being sought by a SUPL agent that may be internal to the SET 12 (e.g. the SUPL agent 22) or external to the SET 12 (e.g. the SUPL agent 28). The SET 12 may perform functions such as privacy, security, positioning measurement and position calculation for location services. In some implementations of SUPL, the SUPL agent 22 may directly support SUPL procedures (e.g. interaction with H-SLP 16 as described later for FIG. 5) on behalf of some other client application.

The SET 12 is configured to communicate with the communication network 14 (e.g. via the RAN 13 and core network 15) for various services such as originating and/or receiving voice calls, packet data sessions, messaging, and so on. The SET 12 may also communicate with SUPL capable entities via the network 14—e.g. an H-SLP 16. The network 14 may be a wireless network such as a cdma2000 network, a UMTS network, an LTE network, a GSM network, some other radio access network (RAN), a WLAN, and so on. The network 14 may also be a wireline network such as an IP-based network, a phone network, a cable network, and so on. In some cases, the network 14 may comprise multiple individual networks (e.g., an LTE network and a separate UMTS network each connected to the Internet). In such a case, the SET 12 and the H-SLP 16 may connect to different networks. As one particular example, the SET 12 may connect to the RAN 13 (e.g., an LTE network) whereas the H-SLP 16 may connect to either the core network 15 that connects to the SET 12 via the RAN 13 or to the Internet that connects to the core network 15. The SET 12 may also receive signals from one or more navigation satellites 20 that form all or part of a Satellite Positioning System (SPS). The SPS may include or be part of a Global Navigation Satellite System (GNSS) such as the Global Positioning System (GPS), the European Galileo system, the Russian Glonass system, or some other satellite positioning system. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The SET 12 may measure signals from SPS satellites 20 and/or from base stations, wireless access points (APs), femtocells, etc. in the network 14 (e.g. in the RAN 13) and may obtain pseudo-range measurements for the SPS satellites 20 and/or network measurements from the base stations, APs and femtocells. The satellite pseudo-range and/or network measurements may be used to derive a position estimate for the SET 12 which may be computed by the SET 12 or by the H-SLP 16 if the SET 12 sends the measurements to the H-SLP 16.

The H-SLP 16 is responsible for SUPL service management and position determination. SUPL service management may include managing locations of SETs and storing, extracting, and modifying location information of target SETs. The H-SLP 16 may include a SUPL Location Center (SLC) 24 and a SUPL Positioning Center (SPC) 26. The SLC 24 performs various functions for location services, coordinates the operation of SUPL, and interacts with SETs over a user plane bearer. The SLC 24 may perform functions for privacy, initiation, security, roaming support, charging/billing, service management, position calculation, and so on. The SPC 26 supports positioning for SETs, is responsible for messages and procedures used for position calculation, and supports delivery of assistance data to the SETs to assist SETs in acquiring and measuring signals (e.g. from SPS satellites 20 and/or from base stations and APs in RAN 13) and/or to compute a location. The SPC 26 may perform functions for assistance data delivery, retrieval of measurements and/or location estimates from SETs, position calculation, and so on. An SPC may have access to GPS receivers (e.g. located in a reference network, perhaps a global one) and may receive signals for SPS satellites and/or receive data derived from SPS signals from a reference network so that it can provide assistance data to SETs. In some implementations, SLC 24 and SPC 26 may be physically and/or logically combined.

The target SET 12 includes a SUPL agent 22 and the client 18 includes a SUPL agent 28. A SUPL agent (e.g., either of the SUPL agents 22, 28) is a function or an entity that obtains location information (e.g. a location estimate) for a target SET. In general, a SUPL agent may reside in (i) an external entity (e.g., the SUPL agent 28) such as an external entity associated with a computer system (e.g. website) or (ii) a SET (e.g., the SUPL agent 22) or (iii) a network entity such some entity in network 14.

The network entities in FIG. 1 may also be referred to by other names in other networks and other location architectures. For example, in a 3GPP-based network (e.g., a UMTS network or LTE network), an SLC may be called or may correspond to a Gateway Mobile Location Center (GMLC), an SPC may be called or may correspond to a Serving Mobile Location Center (SMLC), a standalone SMLC (SAS) or an Enhanced SMLC (E-SMLC), a SET may be called a UE, and a SUPL agent may be called an LCS client. The functions and signaling performed by the 3GPP entities may be similar to or the same as those performed by the corresponding SUPL entities, thereby enabling comparable services and capabilities. In general, an SLC may be called a location center, an LCS server, a location server, a Mobile Positioning Center (MPC), and so on. An SPC may be called a location server, a positioning entity, a positioning server, a positioning center, a Position Determining Entity (PDE), and so on.

SUPL may support some or all of the following position methods (among others): SET assisted Assisted-GPS (A-GPS); SET assisted Assisted-GNSS (A-GNSS); SET based A-GPS; SET based A-GNSS; Autonomous GPS or autonomous GNSS; Advanced forward link trilateration (A-FLT); SET assisted and/or SET based Enhanced observed time difference (E-OTD); SET assisted and/or SET based Observed time difference of arrival (OTDOA) for UMTS and/or for LTE; SET assisted and/or SET based Enhanced cell/sector (E-CID) and cell-ID; SET assisted and/or SET based WiFi positioning (also referred to as WLAN positioning), SET assisted and/or SET based Short Range Node (SRN) positioning and certain SET assisted and/or SET based Hybrid combinations of these. These position methods are referred to later herein as "SUPL position methods" and may be indicated in a SUPL ULP posmethod parameter with an SLP able to indicate one preferred or required SUPL position method for a SUPL session to a SET by sending a ULP message (e.g. a SUPL INIT message) to the SET containing a posmethod parameter set to a particular value to indicate the preferred or required position method.

For SET based mode, which applies to all SUPL position methods listed above with the words "SET based" as part of their names (e.g. SET based A-GNSS), a SET obtains positioning measurements (e.g. of SPS satellites 20 and/or of base stations and access points in RAN 13 in the example in FIG. 1) and determines its position based on these measurements and possibly using assistance data provided by an SPC such as SPC 26 in FIG. 1. For SET assisted mode, which applies to all SUPL position methods listed above with the words "SET assisted" as part of their names (e.g. SET assisted A-GNSS), a SET obtains positioning measurements (e.g. of SPS satellites 20 and/or of base stations and access points in RAN 13 in the example in FIG. 1) and provides these measurements to an SPC (e.g. SPC 26) with the position of the SET then determined by the SPC. For the autonomous mode which applies to all SUPL position methods listed above with the word "autonomous" as part of their names (e.g. autonomous GNSS), a SET obtains positioning measurements (e.g. of SPS satellites 20 and/or of base stations and access points in RAN 13 in the example in FIG. 1) and determines its position based on these measurements without using any assistance data provided by an SPC such as SPC 26 in FIG. 1. For hybrid combinations of two or more of the SUPL position methods listed above, the SET and/or SLP determine a position estimate for the SET based on two or more of the SUPL position methods. For the A-GPS and A-GNSS position methods, a position estimate is determined (by a SET or SPC) based on measurements by the SET of pseudo-ranges for SPS satellites and may have high accuracy (e.g. with an error of 5-100 meters). For the A-FLT, E-OTD, and OTDOA position methods, a position estimate is determined (by a SET or SPC) based on measurements by the SET of differences in base station timing and may have good accuracy (e.g. with an error of 20-200 meters). For the cell-ID position methods, a position estimate is determined by a SET or SLP based on known positions of cell/sector antennas of a cellular network and may have coarse accuracy (e.g. with an error of 500-2000 meters). For the enhanced cell/sector position method, the position estimate may be determined by a SET or SPC based on network measurements of base stations and/or access points such as radio signal timing and signal strengths and may have medium accuracy (e.g. with an error of 100-500 meters). For the WiFi and SRN position methods, a SET or SLP may determine a position estimate based on signal measurements from WiFi Access Points and short range nodes (e.g., Bluetooth) which may normally have high accuracy (e.g. with an error of 5-50 meters). These various position methods are known in the art. The terms "position estimate," "location estimate," "position fix," "position," "location," and "fix" are often used interchangeably. A position estimate may be given in absolute coordinates (e.g., latitude and longitude), in relative coordinates (e.g., number of meters north and east of a known fixed location) or as a civic address or civic location (e.g., street address, city and country) or as some combination of these and may provide an expected error (e.g., may provide a geographic area that represents possible locations of a SET).

SUPL may support one or more of various services, four of which are shown in Table 1.

TABLE 1

| Location Service | Description |
| --- | --- |
| Immediate location service | Provide location information (e.g., the location of a target SET) immediately when requested. |
| Deferred location service | Provide location information for a SET one or multiple times based on periodic triggers or after a specific event has occurred. |
| Assistance data service | Provide single, multiple or continuous assistance data transfer to a SET. |
| Generic SUPL Session | Establishment of secure SUPL session context for extended time periods with a SET. |

Immediate location services may also be referred to as network initiated, SET initiated, roaming, non-roaming, and so on. Deferred location services may include periodic and/or triggered services. For triggered services, the reporting of position estimates is determined by triggers or a trigger mechanism that indicates when to report the SET location to a SUPL agent. The triggers may be determined by the target SET, sent to the H-SLP, and then forwarded to the SUPL agent. Periodic triggers for periodic triggered service may comprise a periodic interval, the number of position reports, and a possible start time to begin reporting. Triggers may be related to area events, a change in the location or velocity of a SET or to other conditions. Area event triggers for area event triggered service may correspond to the SET entering, leaving, or remaining within or remaining outside a predefined geographic area. Triggers related to a change in the location or velocity of a SET may correspond to the SET location, velocity or acceleration changing by predefined thresholds. Triggers may also be combined such that the location of a SET is only obtained when two or more trigger conditions or when one of several alternative triggers have occurred. Additional or other services may also be supported.

Location services supported by SUPL may be categorized as shown in Table 2.

TABLE 2

| Location Service Type | Description |
| --- | --- |
| Network initiated (NI) services | Services that originate from the network, with the SUPL agent residing in or having access to the network. |
| SET initiated (SI) services | Services that originate from the SET, with the SUPL agent residing within or having access to the SET. |

Network initiated may also be referred to as mobile terminated. SET initiated may also be referred to as mobile originated.

SUPL may support two communication modes between a SET and an H-SLP for positioning with an SPC. Table 3 summarizes the two communication modes.

TABLE 3

| Communication Mode | Description |
| --- | --- |
| Proxy mode | The SPC does not have direct communication with the SET, and the SLC acts as a proxy between the SET and the SPC. |
| Non-proxy mode | The SPC has direct communication with the SET. |

SUPL may support roaming and non-roaming for a SET. Table 4 summarizes several roaming and non-roaming modes.

TABLE 4

| Roaming/Non-roaming | Description |
| --- | --- |
| Non-roaming | The SET is within the service area of its H-SLP. |
| Roaming with H-SLP positioning | The SET is outside the service area of its H-SLP, but the H-SLP still provides location functionality. |

TABLE 4-continued

| Roaming/Non-roaming | Description |
| --- | --- |
| Roaming with V-SLP positioning | The SET is outside the service area of its H-SLP, and a V-SLP (Visited SLP) provides location functionality |

As used herein, roaming and non-roaming are with respect to SUPL, and not necessarily with respect to roaming or non-roaming in a serving wireless network such as network 14 in FIG. 1. A serving network such as network 14 may have a different definition of roaming and non-roaming, which are not discussed herein.

The service area of an H-SLP, such as H-SLP 16, is an area within which the H-SLP can provide a position estimate for a SET or relevant assistance data to a SET without contacting other SLPs. When the SET is roaming, the H-SLP may provide location functionality (e.g., position determination and assistance data provision) or may request a V-SLP to provide this location functionality.

A set of message flows may be defined (e.g. in OMA SUPL specifications) for each type of location service supported by SUPL. Each message flow may be applicable for a specific location service and a specific set of conditions, e.g., proxy or non-proxy, roaming or non-roaming, network initiated or SET initiated, triggered or scheduled (e.g., periodic), and so on. A specific message flow may be used to obtain the desired location service for the applicable conditions. Two example message flows are described later herein in FIGS. 4 and 5 to illustrate application of the techniques described here to certain location services that can be supported by SUPL.

Figure 2:
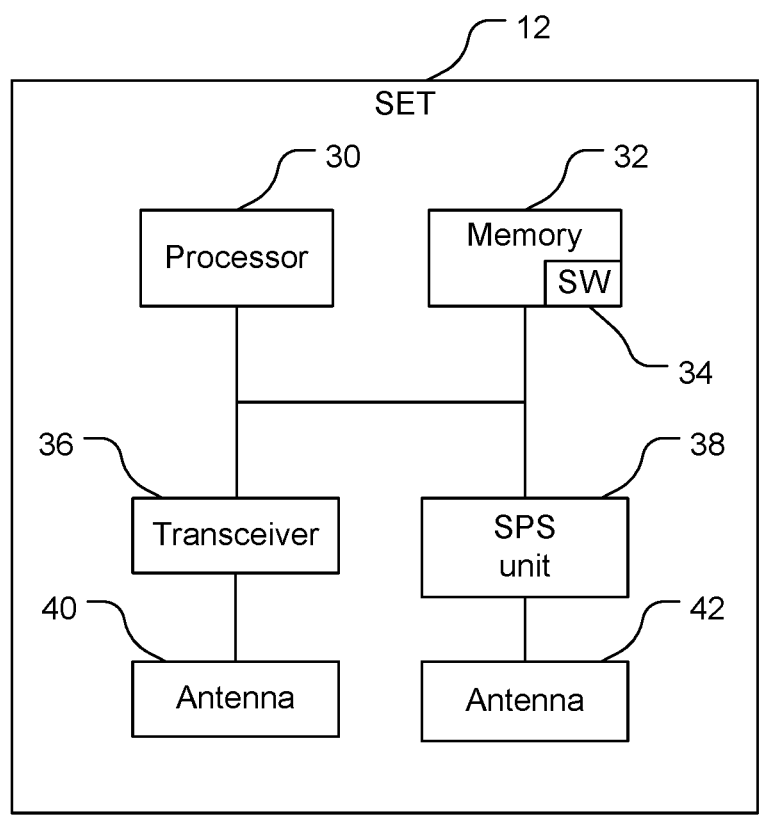
FIG. 2 is a block diagram of portions of a SET shown in FIG. 1.

Referring also to FIG. 2, an example of the SET 12 comprises a computer system including a processor 30, memory 32 including software (SW) 34, a transceiver 36, and a Satellite Positioning System (SPS) unit 38. The transceiver 36 is connected to one or more antennas 40 and is configured to communicate bi-directionally with access points and/or base stations in RAN 13, and/or one or more other entities. The SPS unit 38 is configured to acquire and measure signals from SPS satellites 20 and is connected to one or more antennas 42 which may be the same as antennas 40. The SPS unit 38 may be implemented by the processor 30 and the memory 32, or as a separate entity. The transceiver 36 is configured to send and receive signals from and to access points and base stations in RAN 13, and may also receive signals from the SPS satellites 20. The processor 30 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 30 may comprise multiple separate physical entities that can be distributed in the SET 12. The memory 32 includes random access memory (RAM) and/or read-only memory (ROM). The memory 32 is a non-transitory processor-readable storage medium that stores the software 34 which is processor-readable, processor-executable software code containing processor-readable instructions that are configured to, when executed, cause the processor 30 to perform various functions described herein (although the description may refer only to the processor 30 performing the functions). Alternatively, the software 34 may not be directly executable by the processor 30 but configured to cause the processor 30, e.g., when compiled and executed, to perform the functions. The processor 30 is communicatively coupled to the memory 32 and the transceiver 36 and configured to perform a variety of functions, e.g., in accordance with the software 34.

The processor 30 may further be configured to determine a location of the SET 12. For example, the processor 30 may analyze signals received from access points and/or base stations in RAN 13 (e.g., to determine received signal strength indications (RSSIs) and/or times of arrival) and known locations of the access points and/or the base stations (e.g., provided by the H-SLP 16) to determine the location. Also or alternatively, the SPS unit 38 may process SPS signals received via the antenna(s) 42 to measure code phases or pseudo-ranges and possibly determine the location of the SET 12 from these measurements. The processor 30 may use the signals from the access points, the base stations, and/or the satellites 20 to perform trilateration (e.g. which may use three or more measurements) to determine the location of the SET 12. Further, the processor 30 may combine location determination techniques, e.g., averaging or weighted averaging location data from multiple location determination techniques (e.g., using A-GNSS, OTDOA, E-CID, etc.), to determine the location of the SET 12.

Figure 3:
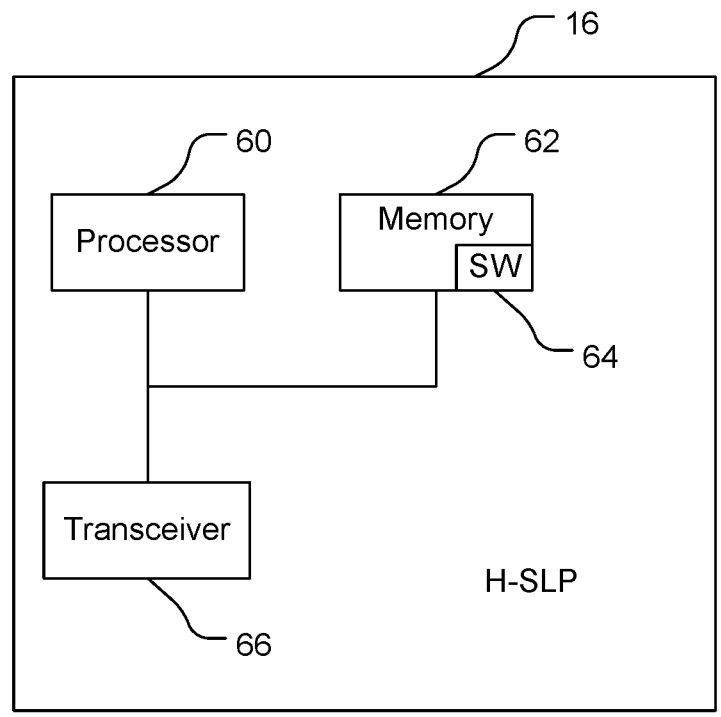
FIG. 3 is a block diagram of portions of an SLP shown in FIG. 1.

Referring also to FIG. 3, the H-SLP 16 comprises a computer system including a processor 60, memory 62 including software (SW) 64, and a transceiver 66. The transceiver 66 is configured to send and receive signals to and from one or more elements in the network 14 (e.g. directly or via another network or networks such as the Internet). The processor 60 preferably includes an intelligent hardware device, e.g., a central processing unit (CPU) such as those made or designed by QUALCOMM®, ARM®, Intel® Corporation, or AMD®, a microcontroller, and/or an application specific integrated circuit (ASIC), etc. The processor 60 may comprise multiple separate physical entities that can be distributed in the H-SLP 16. The memory 62 includes random access memory (RAM) and/or read-only memory (ROM). The memory 62 is a non-transitory processor-readable storage medium that stores the software 64 which is processor-readable, processor-executable software code containing processor-readable instructions that are configured to, when executed, cause the processor 60 to perform various functions described herein (although the description may refer only to the processor 60 performing the functions). Alternatively, the software 64 may not be directly executable by the processor 60 but configured to cause the processor 60, e.g., when compiled and executed, to perform the functions. The processor 60 is communicatively coupled to the memory 62 and the transceiver 66 and configured to perform a variety of functions, e.g., in accordance with the software 64. The processor 60 and the memory 62 are configured to implement the SLC 24 and the SPC 26, and thus reference may be made below to the SLC 24 or the SPC 26 as shorthand for reference to the processor 60 and, as appropriate, the memory 62.

Figure 4:
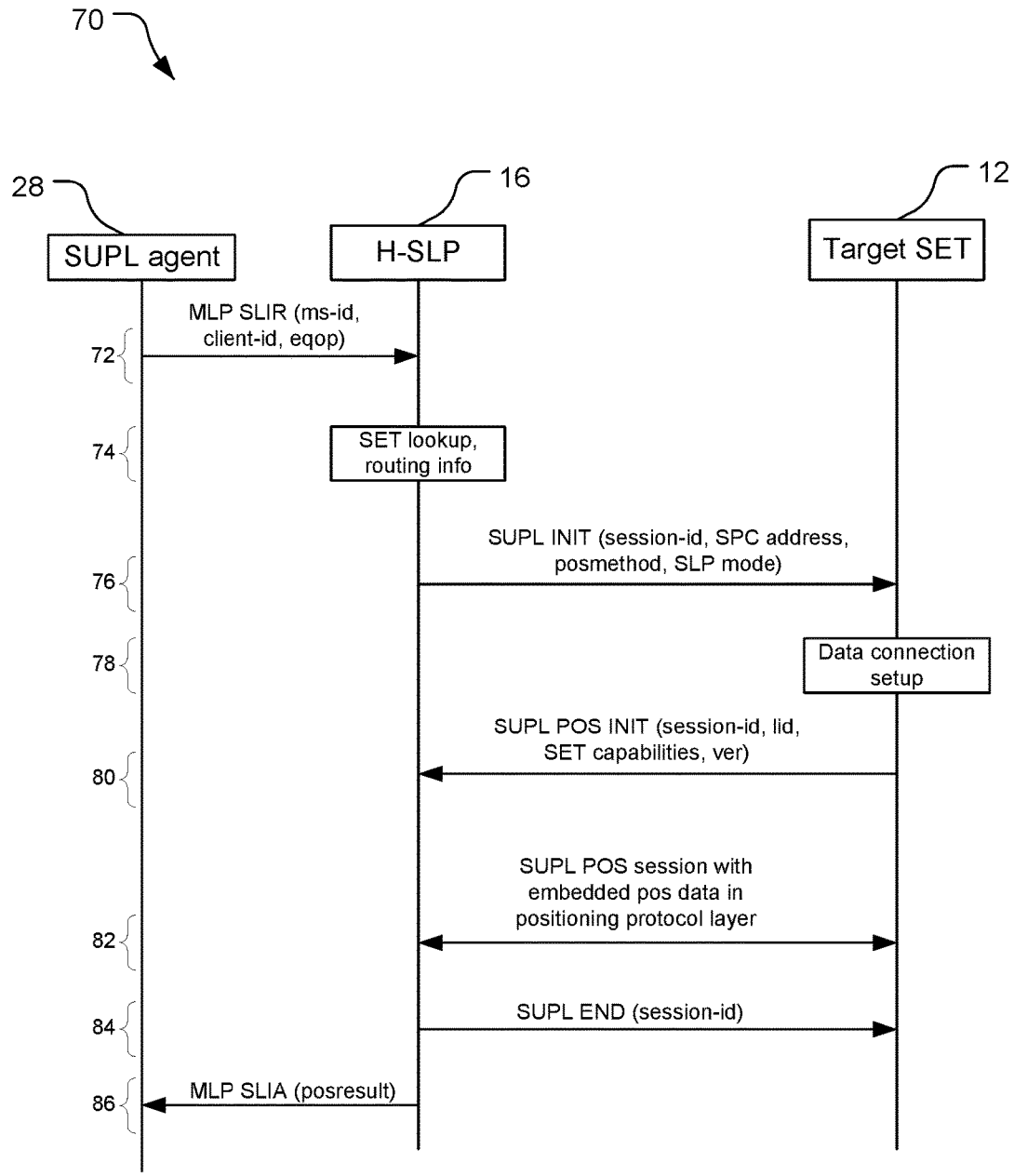
FIG. 4 is a diagram of a call flow for mobile device position determination.

Referring also to FIG. 4, a call flow 70 shows interactions between the SUPL agent 28, the H-SLP 16, and the target SET 12 for a network-initiated, non-roaming, proxy-mode SUPL procedure to determine a location of the target SET 12. The H-SLP 16 and the target SET 12 are configured to communicate with each other through the network 14 (not shown in FIG. 4). While not explicitly mentioned below, the processor 60 of the H-SLP 16 is configured to communicate with, sending messages to and receiving messages from, the target SET 12 via the transceiver 66, and the processor 30 of the target SET 12 is configured to communicate with, sending messages to and receiving messages from, the H-SLP 16 via the transceiver 36. The H-SLP 16, and the target SET 12 are configured to establish and use an embedded positioning protocol (embedded in SUPL ULP communications) to select a position method, and exchange positioning information (e.g., assistance information, determined location information, etc.). The call flow 70 includes the stages shown, although stages may be added, removed, or rearranged (e.g., combined or separated).

At stage 72, the SUPL agent 28 and the H-SLP 16 are configured to identify the target SET 12 and prepare to initiate a SUPL location session with the target SET 12. The SUPL agent 28 is configured to issue a Mobile Location Protocol (MLP) Standard Location Immediate Request (SLIR) message to the H-SLP 16 associated with the SUPL agent 28. The MLP SLIR message includes a mobile station ID (ms-id) (e.g. which may identify the SET 12), a client ID (client-id) (e.g. which may identify the SUPL agent 28), and an expected Quality of Position (eqop) (e.g., a required accuracy of location). The H-SLP 16 is configured to authenticate the SUPL agent 28 and determine, based on the client-id in the MLP SLIR message, whether the SUPL agent 28 is authorized for a service requested in the MLP SLIR message for the SET 12. The H-SLP 16 is further configured to apply subscriber privacy against the client-id based on the received ms-id. For example, the H-SLP 16 may decide whether the SUPL agent 28 is allowed to locate the SET 12, based on privacy requirements for the SET 12 which may be configured in the H-SLP 16, and whether the location (if allowed) is to be notified to and/or verified by the SET 12.

At stage 74, the H-SLP 16 checks whether the target SET 12 (e.g. identified by the ms-id) is roaming and possibly whether the target SET 12 supports SUPL. The H-SLP 16 is configured to look up the target SET 12 (e.g. using data for the SET 12 available to the H-SLP 16) and verify that the target SET 12 is not SUPL roaming. The H-SLP 16 may also be configured to verify that the target SET 12 supports SUPL.

At stage 76, the H-SLP 16 initiates a location session with the target SET 12. The H-SLP 16 is configured to produce and send a SUPL Initialization (INIT) message to the target SET 12. The SUPL INIT message is a SUPL User Plane Location Protocol (ULP) layer message and includes a session ID (session-id), a posmethod parameter (also referred to as a positioning method parameter), and an SLP mode indicator. The H-SLP 16 is configured to, in response to the privacy check in stage 72 indicating whether notification or verification to the target SET 12 is required, possibly include a notification element in the SUPL INIT message. The H-SLP 16 is also configured to store a hash of the SUPL INIT message which may be a value determined from the binary encoding of the SUPL INIT. The SLP mode indicator indicates proxy mode.

The posmethod parameter in the SUPL INIT message normally indicates a position method selected by the H-SLP 16 that is to be used by the target SET 12 and/or the H-SLP 16 to determine the location of the target SET 12. The H-SLP 16, however, is configured according to the techniques described here (e.g. the first, second or third techniques referred to previously) to include in the posmethod parameter a positioning protocol indicator. The positioning protocol indicator specifies one or more of the following: (i) the position method(s) will be selected by the H-SLP 16 in a positioning protocol layer; (ii) the SET 12 positioning capabilities will be transferred to the H-SLP 16 in the positioning protocol layer; and/or (iii) a particular positioning protocol or particular positioning protocols will be used for the positioning protocol layer. The positioning protocol indicator may serve as a "switch" to change the interaction of H-SLP 16 with SET 12 such that one or more of (i), (ii) and (iii) above are performed in a positioning protocol layer rather than in the SUPL ULP layer. The positioning protocol may be any of LPP, LPPe, LPP/LPPe, RRC, RRLP, TIA-801 or some other protocol and in some implementations, more than one positioning protocol may be used (e.g. LPP with LPPe). The particular positioning protocol(s) may further be indicated by H-SLP 16 to SET 12 using the positioning protocol indicator when (iii) above is indicated.

As an example, when (i) and (ii) above are both indicated, the positioning protocol indicator explicitly or implicitly indicates that SET capability transfer and positioning method selection are to be conducted in a positioning protocol layer. As an example of an implicit indication by the posmethod parameter that SET capability transfer and positioning method selection are to be conducted in a positioning protocol layer, the positioning protocol indicator may provide a generic positioning protocol layer indication (also referred to as a generic indication). Indicating that the positioning protocol layer is to be used means that positioning protocol communications (e.g. LPP or LPP/LPPe messages) are to be used to transfer SET 12 capabilities to H-SLP 16 and select the positioning method(s) to be used, with the positioning protocol communications embedded in the SUPL communications (e.g. by embedding one or more LPP or LPP/LPPe messages inside certain ULP messages such as a SUPL POS or SUPL POS INIT message). As an example of a generic positioning protocol layer indication, the positioning protocol indicator could indicate "positioning protocol" or "generic" without indicating a specific positioning protocol. The target SET 12 may be configured to respond to the generic positioning protocol layer indication by selecting a positioning protocol and embedding communications in accordance with the selected positioning protocol in SUPL communications (e.g. a SUPL POS INIT message) with the H-SLP 16. The positioning protocol selected by the target SET 12 may be a default protocol, or an otherwise predetermined protocol, that the H-SLP 16 will expect the target SET 12 to use in response to the generic positioning protocol layer indication of the positioning protocol indicator. As another example of another indication by the posmethod parameter, the posmethod parameter may include a positioning protocol indicator that indicates a specific positioning protocol or protocols (e.g., LPP, LPPe or LPP/LPPe). The indication of a specific positioning protocol or protocols may further implicitly indicate that SET 12 capability transfer to H-SLP 16 and position method selection by H-SLP 16 (or by SET 12) are to be conducted using the specified positioning protocol(s). The SET 16 (e.g. the processor 30) may be configured to ignore any information in any subsequent SUPL ULP messages (e.g., in the present positioning session) from the H-SLP 16 regarding SET capability transfer or position method selection in response to the SET 12 (e.g. the processor 30) receiving the posmethod parameter with the positioning protocol indicator at stage 76.

The H-SLP 16 (e.g. the processor 60) may further be configured to specify certain data that are to be transferred between the H-SLP 16 and the target SET 12 in the positioning protocol layer only and not in the SUPL ULP layer. Examples of such data can include the positioning capabilities of the H-SLP 16 which may be transferred from the H-SLP 16 to the SET 12, and positioning related measurements obtained by the SET 12 (e.g. a location estimate for SET 12 or measurements such as RSSI and/or relative signal time of arrival for base stations and/or access points in RAN 13) which may be transferred from the SET 12 to the H-SLP 16. The H-SLP 16 (e.g. the processor 60) is preferably configured to send a SUPL ULP message to the target SET 12 indicating the specified data that are to be transferred between the H-SLP 16 and the target SET 12 in the positioning protocol layer only. This indication may be explicit (e.g. included in a parameter for the SUPL ULP message such as the posmethod parameter or some other parameter) or may be implicit, e.g., by the H-SLP 16 (e.g. the processor 60) sending an indication of what information the H-SLP 16 expects to be transferred between the H-SLP 16 and the SET 12 in the SUPL ULP layer, with information not so indicated being implicitly specified to be transferred in the positioning protocol layer. Preferably, this SUPL ULP message specifying these data, which may be referred to as a specified-data SUPL message, is the same message that includes the posmethod parameter, although a message separate from the message including the posmethod parameter may be used. Here, the message including the posmethod parameter is the SUPL INIT message sent at stage 76, but other messages (e.g., SUPL RESPONSE (for a SET-initiated session) or SUPL TRIGGERED RESPONSE) may be used to convey the posmethod parameter from H-SLP 16 to SET 12.

At stage 78 in FIG. 4, the target SET 12 analyzes the SUPL INIT message received at stage 76 and prepares for establishment of a SUPL session. The SET 12 (e.g. the processor 30) may be configured to determine whether the SUPL INIT message from stage 76 is authentic. The SET 12 (e.g. the processor 30) may be configured to take no further actions in response to the SET 12 determining that the SUPL INIT message is not authentic, and to prepare for establishment (or resumption) of a secure connection with the H-SLP 16 in response to determining that the SUPL INIT message is authentic.

Also at stage 78, the target SET 12 (e.g. the processor 30) establishes a secure IP based connection with the H-SLP 16. The SET 12 (e.g. the processor 30) is configured to evaluate the notification rules and take appropriate action(s). The SET 12 (e.g. the processor 30) is further configured to analyze the proxy/non-proxy mode indicator to determine the mode of the H-SLP 16. In the example of FIG. 4, proxy mode is used, and the SET 12 (e.g. the processor 30) is configured to respond to this by using an address provisioned in the SET 12 to establish a secure IP based connection to the H-SLP 16.

At stage 80, the target SET 12 is configured to send a SUPL POS INIT message to the H-SLP 16 to continue the SUPL positioning session with the H-SLP 16. The SUPL POS INIT message includes a session ID (session-id), a location identity (lid) (e.g. which may include position measurements obtained by SET 12 for base stations and/or access points in RAN 13), and SET capabilities. In a normal SUPL session, the SET capabilities may indicate the positioning methods supported by the target SET 12 (e.g., SET-Assisted A-GPS, SET-Base A-GPS) and associated positioning protocols (e.g., RRLP, RRC, TIA-801, LPP, or LPP/LPPe) supported by the SET 12. However, when the posmethod parameter received at stage 76 by the SET 12 includes a positioning protocol indicator as described previously for stage 76 or when the SUPL INIT message at stage 76 indicates certain data is to be transferred between the H-SLP 16 and SET 12 at the positioning protocol layer, the SET 12 (e.g. the processor 30) may be configured not to include the SET capabilities parameter and/or not to include the location identity (lid) parameter in the SUPL POS INIT message or may be configured to include one or both of these parameters containing dummy or default information (e.g. such as pre-configured fixed values or a minimal number of values). As an example, if the positioning protocol indicator in the posmethod parameter indicates that SET 12 capabilities are to be transferred to H-SLP 16 using the positioning protocol layer, the SET 12 (e.g. the processor 30) may be configured to not include the SET capabilities in the SUPL POS INIT message or may be configured to include the SET capabilities containing dummy or default information. Similarly, if the posmethod parameter (e.g. the positioning protocol indicator) or some other parameter in the SUPL INIT message at stage 76 indicates that positioning measurements from the SET 12 are to be transferred to H-SLP 16 using the positioning protocol layer, the SET 12 (e.g. the processor 30) may be configured not to include the lid parameter in the SUPL POS INIT message or may be configured to include the lid parameter containing dummy or default information.

The target SET 12 may provide the position (e.g. the approximate position) of the target SET 12 in the SUPL POS INIT message sent at stage 80 (e.g. if known by the SET 12) and the SUPL POS INIT message may include one or more messages for a positioning protocol layer (e.g. one or more LPP or LPP/LPPe messages which may be included in a SUPL POS message embedded in the SUPL POS INIT message sent at stage 80). If the positioning protocol indicator in the posmethod parameter received at stage 76 in the SUPL INIT message indicates that SET capabilities will be transferred in the positioning protocol layer, at least one positioning protocol message may be included in the SUPL POS INIT message at stage 80 by SET 12 (e.g. may be embedded in a SUPL POS message which may itself be carried in the SUPL POS INIT message) to convey the SET 12 capabilities (e.g. positioning protocol capabilities) to H-SLP 16. Similarly, if the posmethod parameter or some other parameter received at stage 76 in the SUPL INIT message indicates that positioning measurements (e.g. of base stations and/or access points in RAN 13) will be transferred in the positioning protocol layer, at least one positioning protocol message included in the SUPL POS INIT message at stage 80 (e.g. carried in a SUPL POS message embedded in the SUPL POS INIT) may include positioning measurements obtained by SET 12. Transfer of SET capabilities and/or positioning measurements in the positioning protocol layer may then be used instead of transfer in the ULP layer. The SET 12 may also be configured to calculate a hash of the SUPL INIT message received at stage 76 and include the hash in the SUPL POS INIT message sent at stage 80.

The H-SLP 16 (e.g. the processor 60) may be configured to ignore (e.g., not process) the SET capabilities and/or the lid parameter in the SUPL POS INIT message received at stage 80 in response to the posmethod parameter or some other parameter included in the SUPL INIT at stage 76 causing the SET 12 to include dummy or default information for the SET capabilities and/or the lid parameter in the SUPL POS INIT message as described above. Further, the H-SLP 16 may check at stage 80 that the hash of the SUPL INIT message included in the SUPL POS INIT message matches a hash computed by the H-SLP 16, preferably before starting the positioning protocol session.

At stage 82, the H-SLP 16 and the target SET 12 may conduct a positioning protocol session (as part of the SUPL positioning session) using either the positioning protocol(s) indicated (explicitly or implicitly) by the positioning protocol indicator provided in the posmethod parameter at stage 76 or using a positioning protocol or protocols chosen by the H-SLP 16 or SET 12 in some other way when positioning protocols are not indicated by a positioning protocol indicator in the posmethod parameter at stage 76. The positioning protocol messages are embedded in SUPL ULP messages (e.g. SUPL POS messages) that are exchanged between the H-SLP 16 and SET 12 at stage 82. The target SET 12 (e.g. the processor 30) may be configured to send one or more positioning protocol messages to the H-SLP 16 that provide the SET 12 capabilities regarding positioning methods supported by the target SET 12 and/or regarding other positioning capabilities of SET 12 such as the types of assistance data that are supported by the SET 12 and/or the types of positioning measurements that are supported by the SET 12. The SET 12 capabilities may be provided if the positioning protocol indicator in the posmethod parameter received at stage 76 indicates (implicitly or explicitly) that SET capabilities are to be transferred at the positioning protocol layer and/or if the positioning protocol indicator received at stage 76 indicates that position method selection will take place at the positioning protocol layer.

The H-SLP 16 (e.g. the processor 60) may be configured to select a position method based on the SET capabilities received from the SET 12 within a positioning protocol message (e.g. received by H-SLP 16 at stage 80 or stage 82) or based on other information (e.g. positioning measurements received from the SET 12 or an assistance data request received from the SET 12 in a positioning protocol message received at stage 80 or stage 82). The H-SLP 16 (e.g. the processor 60) may select a single position method (e.g., A-GPS, WLAN, Bluetooth®, etc.) or a combination of two or more position methods supported by the target SET 12. Following selection of a position method or position methods, the H-SLP 16 (e.g. the processor 60) may be configured to send a positioning protocol message to the target SET 12 to request the SET 12 to determine a location of the target SET 12 (SET-based positioning) using a selected position method. Also or alternatively, the H-SLP 16 (e.g. the processor 60) may be configured to send a positioning protocol message to the target SET 12 to request the SET 12 determine the target SET location (SET-based positioning) using multiple selected position methods and combine the locations (e.g., average coordinates determined using different techniques, weighted average the coordinates, etc.). Also or alternatively, the H-SLP 16 (e.g. the processor 60) may be configured to send a positioning protocol message to the target SET 12 to request the SET 12 to provide multiple locations for the target SET 12 determined from one or more position methods. The H-SLP 16 may combine the multiple provided locations (e.g., by averaging, weighted averaging, etc.). Also or alternatively, the H-SLP 16 (e.g. the processor 60) may be configured to send a positioning protocol message to the target SET 12 to request the SET 12 to provide measurement data (SET-assisted positioning) collected for one or more position methods (e.g. GNSS pseudo-ranges, OTDOA time difference measurements or other cell/sector or access point measurements, etc.), after which the H-SLP 16 (e.g. the processor 60) may calculate the location of the target SET 12 using the provided measurement data (e.g., using a single position method, or using multiple position methods and combining multiple results to determine a single location, etc.).

In some embodiments, stage 82 may be omitted (e.g. if the SET 12 transfers sufficient positioning measurements and/or a location estimate at stage 80 to enable H-SLP 16 to obtain a location estimate for SET 12 satisfying any eqop provided by SUPL agent 28 at stage 72).

At stage 84, the SUPL positioning session is terminated. The H-SLP 16 is configured to send a SUPL END message to the target SET 12 informing the target SET 12 that no further positioning procedure will be started and that the SUPL session (identified by a provided session-id) is finished. The target SET 12 (e.g. the processor 30) is configured to respond to the SUPL END message by releasing the secure connection to the H-SLP 16 and releasing resources related to the session.

At stage 86, the H-SLP 16 is configured to inform the SUPL agent 28 of the determined position from stage 80 or stage 82. The H-SLP 16 is configured to respond to the termination of the SUPL session by releasing resources related to the session. The H-SLP 16 is further configured to send the determined location (determined position estimate) as a posresult parameter to the SUPL agent 28 in an MLP SLIA (Standard Location Immediate Answer) message.

Figure 5:
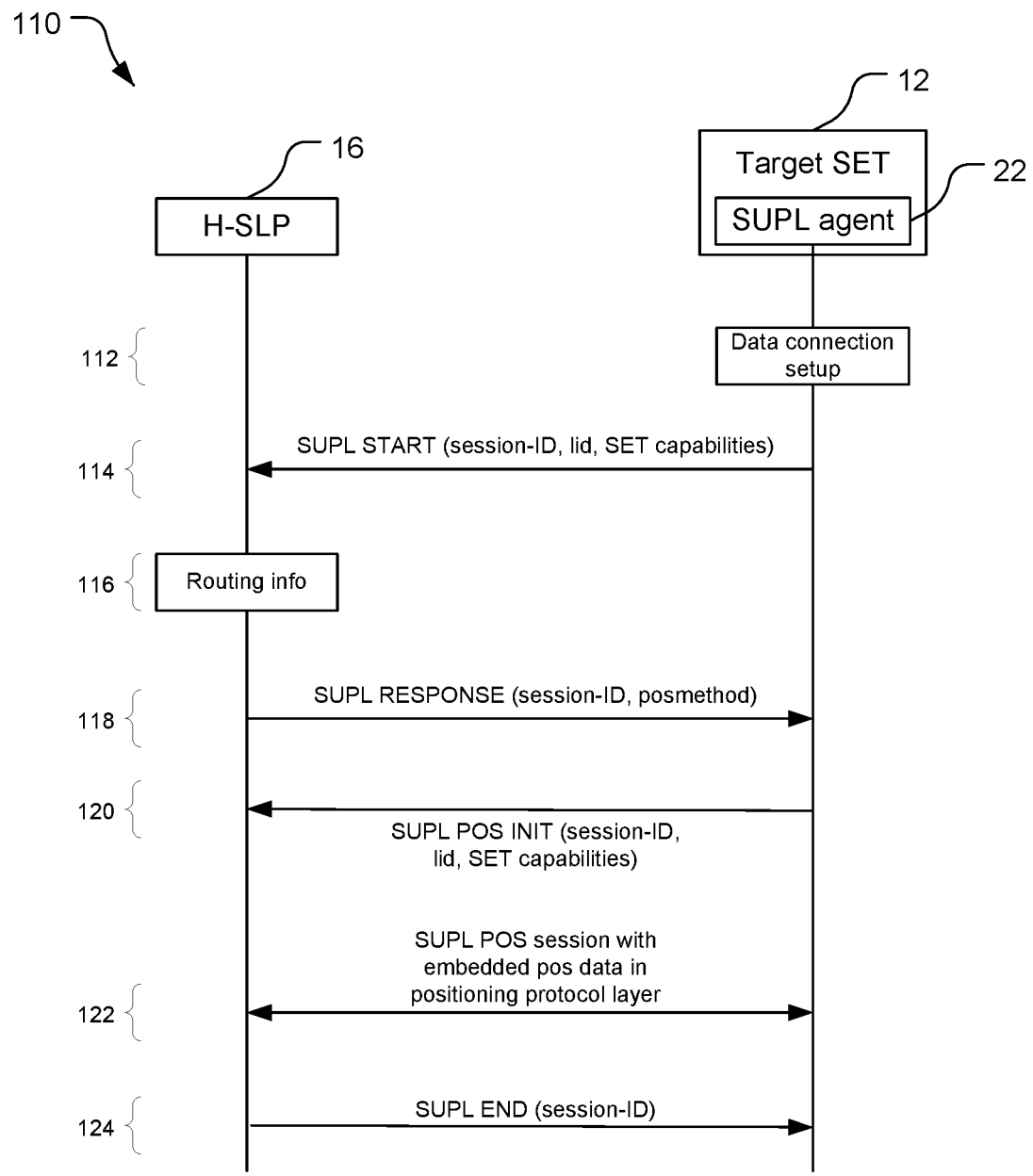
FIG. 5 is a diagram of another call flow for mobile device position determination.

Referring also to FIG. 5, a call flow 110 shows interactions between the SUPL agent 22 in the target SET 12 and the H-SLP 16 for a SET-initiated, non-roaming, proxy-mode SUPL procedure to determine a location of the target SET 12. The H-SLP 16 and the target SET 12 are configured to communicate with each other through the network 14 (not shown in FIG. 5). While not explicitly mentioned below, the processor 60 of the H-SLP 16 is configured to communicate with, sending messages to and receiving messages from, the target SET 12 via the transceiver 66, and the processor 30 of the target SET 12 is configured to communicate with, sending messages to and receiving messages from, the H-SLP 16 via the transceiver 36. The H-SLP 16, and the target SET 12 are configured to establish and use an embedded positioning protocol (embedded in SUPL ULP communications) to establish a positioning method, and exchange positioning information (e.g., assistance information, determined location information, etc.). The call flow 110 includes the stages shown, although stages may be added, removed, or rearranged (e.g., combined or separated).

At stage 112, a client application (e.g. the SUPL agent 22) on the target SET 12 may request a location for the target SET 12 from the SET 12 (e.g. from a positioning engine on the SET 12). The target SET 12 (e.g. a positioning engine on the target SET 12 or the SUPL agent 22 on the target SET 12) then sets up or resumes a secure data connection (e.g. IP connection) to the H-SLP 16. The SET 12 (e.g. the processor 30) may be configured to use an address of the H-SLP 16 (e.g., provisioned in memory 32 of the SET 12 by a home network of the target SET 12) to establish the secure connection to the H-SLP 16 at stage 112.

At stage 114, the SET 12 (e.g. the processor 30) is configured to produce and send a SUPL START message to the H-SLP 16 using the secure connection established at stage 112. The SUPL START message includes a session ID (session-id), a location identity (lid), and SET capabilities. The SET capabilities may indicate the positioning methods supported by the target SET 12 (e.g., SET-Assisted A-GPS, SET-Base A-GPS) and associated positioning protocols (e.g., RRLP, RRC, TIA-801, LPP, or LPP/LPPe).

At stage 116, the H-SLP 16 checks whether the target SET 12 is roaming. The H-SLP 16 (e.g. the processor 60) is configured to verify that the target SET 12 is not currently SUPL roaming.

At stage 118, the H-SLP 16 returns a SUPL RESPONSE message to the SET 12 containing the session ID and a posmethod parameter (also referred to as a positioning method parameter). In a normal implementation of SUPL, the posmethod parameter can indicate to the SET 12 a position method selected by the H-SLP 16. Using one or more of the techniques described here, the H-SLP 16 may instead be configured in an unconventional manner to fill the posmethod parameter of the SUPL RESPONSE message with a positioning protocol indicator. The positioning protocol indicator may indicate one or more of the following: (i) the position method(s) will be selected by the H-SLP 16 in a positioning protocol layer; (ii) the SET 12 positioning capabilities will be transferred to the H-SLP 16 in the positioning protocol layer; and/or (iii) a particular positioning protocol or particular positioning protocols will be used for the positioning protocol layer. The positioning protocol indicator, as discussed above, is an implicit or explicit indication that SET capability transfer and/or positioning method selection are to be conducted in a positioning protocol layer. In addition, the H-SLP 16 may use the positioning protocol indicator or some other parameter in the SUPL RESPONSE message to further indicate to the SET 12 that certain other data (e.g. positioning measurements obtained by the SET 12, a request for assistance data from the SET 12, and/or positioning capabilities of the H-SLP 16) are to be transferred between the SET 12 and the H-SLP 16 using the positioning protocol layer rather than the SUPL ULP protocol layer. The H-SLP 16 (e.g. the processor 60) is configured to produce and send the SUPL RESPONSE message to the target SET 12 and to include the session-id, and the posmethod parameter. The SUPL RESPONSE may include location information giving an initial approximation of the location of the target SET 12 based on information received in the SUPL START at stage 114.

At stage 120, the target SET 12 (e.g. the processor 30) is configured to send a SUPL POS INIT message to the H-SLP 16 to continue the SUPL positioning session with the H-SLP 16. The SUPL POS INIT message includes the session ID (session-id) from stage 118, a location identity (lid) (e.g. which may include position measurements obtained by SET 12 for base stations and/or access points in RAN 13), and SET capabilities. In a normal SUPL session, the SET capabilities may indicate the positioning methods supported by the target SET 12 (e.g., SET-Assisted A-GPS, SET-Base A-GPS) and associated positioning protocols (e.g., RRLP, RRC, TIA-801, LPP, or LPP/LPPe) supported by the SET 12. However, when the posmethod parameter received at stage 118 by the SET 12 includes a positioning protocol indicator as described above for stage 118 or when the SUPL RESPONSE message at stage 118 indicates certain other data is to be transferred between the H-SLP 16 and SET 12 at the positioning protocol layer, the SET 12 (e.g. the processor 30) may be configured to not include the SET capabilities and/or the location identity (lid) in the SUPL POS INIT message at stage 120 or may be configured to include one or both of these parameters containing dummy or default information (e.g. pre-configured fixed values or a minimal number of values). As an example, if the positioning protocol indicator in the posmethod parameter at stage 118 indicates that SET 12 capabilities are to be transferred to H-SLP 16 using the positioning protocol layer, the SET 12 (e.g. the processor 30) may be configured to not include the SET capabilities in the SUPL POS INIT message at stage 120 or may be configured to include the SET capabilities containing dummy or default information. Similarly, if the posmethod parameter (e.g. the positioning protocol indicator) or some other parameter in the SUPL RESPONSE message at stage 118 indicates that positioning measurements from the SET 12 are to be transferred to H-SLP 16 using the positioning protocol layer, the SET 12 (e.g. the processor 30) may be configured to not include lid parameter in the SUPL POS INIT message at stage 120 or may be configured to include the lid parameter containing dummy or default information.

The SET 12 may provide the position (e.g. an approximate position) of the target SET 12 in the SUPL POS INIT message at stage 120 and the SUPL POS INIT message at stage 120 may include one or more messages for a positioning protocol layer (e.g. one or more LPP or LPP/LPPe messages which may be included in a SUPL POS message embedded in the SUPL POS INIT message at stage 120). If the positioning protocol indicator in the posmethod parameter received at stage 118 in the SUPL RESPONSE message indicates that SET capabilities will be transferred in the positioning protocol layer, at least one positioning protocol message may be included in the SUPL POS INIT message by SET 12 at stage 120 (e.g. may be embedded in a SUPL POS message which may itself be carried in the SUPL POS INIT message) to convey the SET 12 capabilities (e.g. positioning protocol capabilities) to H-SLP 16. Similarly, if the posmethod parameter or some other parameter received at stage 118 in the SUPL RESPONSE message indicates that positioning measurements (e.g. of base stations and/or access points in RAN 13) will be transferred in the positioning protocol layer, at least one positioning protocol message included in the SUPL POS INIT message at stage 120 (e.g. carried in a SUPL POS message embedded in the SUPL POS INIT) may include positioning measurements obtained by SET 12. Transfer of SET capabilities and/or positioning measurements in the positioning protocol layer may then be used instead of transfer in the ULP layer.

The H-SLP 16 (e.g. the processor 60) may be configured to ignore (e.g., not process) the SET capabilities and/or the lid parameter in the SUPL POS INIT message received at stage 120 whenever the posmethod parameter or some other parameter included in the SUPL RESPONSE at stage 118 causes the SET 12 to include dummy or default information for the SET capabilities and/or the lid parameter in the SUPL POS INIT message as described above.

At stage 122, the H-SLP 16 and the target SET 12 may conduct a positioning protocol session (as part of the SUPL session) using either the positioning protocol(s) indicated (explicitly or implicitly) by the positioning protocol indicator provided in the posmethod parameter at stage 118 or using a positioning protocol or protocols chosen by the H-SLP 16 or SET 12 in some other way when positioning protocols are not indicated by a positioning protocol indicator in the posmethod parameter at stage 118. The positioning protocol messages are embedded in SUPL ULP messages (e.g. SUPL POS messages) which may be exchanged between the H-SLP 16 and SET 12 at stage 122. The target SET 12 (e.g. the processor 30) may be configured to provide SET capabilities to the H-SLP 16, in one or more positioning protocol messages sent to the H-SLP at stage 122. The SET capabilities may indicate the positioning methods supported by the target SET 12 and/or other positioning capabilities of SET 12 such as the types of assistance data that are supported by the SET 12 and/or the types of positioning measurements that are supported by the SET 12. The SET capabilities may be provided if the positioning protocol indicator in the posmethod parameter received at stage 118 indicates (implicitly or explicitly) that SET capabilities are to be transferred at the positioning protocol layer and/or if the positioning protocol indicator received at stage 118 indicates that position method selection will take place at the positioning protocol layer.

The H-SLP 16 (e.g. the processor 60) may be configured to select a position method based on the SET capabilities received from the SET 12 within a positioning protocol message (e.g. received by H-SLP 16 at stage 120 or stage 122) or based on other information (e.g. positioning measurements received from the SET 12 or an assistance data request received from the SET 12 in a positioning protocol message received at stage 120 or stage 122). The H-SLP 16 (e.g. the processor 60) may select a single position method (e.g., A-GPS, WLAN, Bluetooth®, etc.) or a combination of two or more position methods supported by the target SET 12. Following selection of a position method or position methods, the H-SLP 16 (e.g. the processor 60) may be configured to send a positioning protocol message to the target SET 12 to request the SET 12 to determine a location of the target SET 12 (SET-based positioning) using a selected position method. Also or alternatively, the H-SLP 16 (e.g. the processor 60) may be configured to send a positioning protocol message to the target SET 12 to request the SET 12 to determine the target SET location (SET-based positioning) using multiple selected position methods and combine the locations (e.g., average coordinates determined using different techniques, weighted average the coordinates, etc.). Also or alternatively, the H-SLP 16 (e.g. the processor 60) may be configured to send a positioning protocol message to the target SET 12 request the SET 12 to provide locations for the target SET 12 determined from one or more position methods, and to combine multiple provided locations (e.g., by averaging, weighted averaging, etc.). Also or alternatively, the H-SLP 16 (e.g. the processor 60) may be configured to send a positioning protocol message to the target SET 12 to request the SET 12 to provide measurement data (SET-assisted positioning) collected for one or more position methods (e.g. GNSS pseudo-ranges, OTDOA time differences, and/or other cell/sector or access point measurements, etc.), after which the H-SLP 16 (e.g. the processor 60) may calculate the location of the target SET 12 using the provided measurement data (e.g., using a single position method, or using multiple position methods and combining multiple results to determine a single location, etc.).

In some embodiments, stage 122 may be omitted (e.g. if the SET 12 transfers sufficient positioning measurements and/or a location estimate at stage 120 to enable the H-SLP 16 to obtain a location estimate for SET 12).

At stage 124, the SUPL session in terminated. The H-SLP 16 (e.g. the processor 60) is configured to send a SUPL END message to the target SET 12 informing the target SET 12 that no further positioning procedure will be started and that the SUPL session (identified by a provided session-id) is finished. The H-SLP 16 may include any determined position in the SUPL END message if the H-SLP determines a position for the SET 12 (e.g. stage 120 or 122). The target SET 12 (e.g. the processor 30) is configured to respond to the SUPL END message by releasing the secure connection to the H-SLP 16 and releasing resources related to the session. The H-SLP 16 is configured to respond to the termination of the SUPL session by releasing resources related to the session.

As an alternative to the SUPL procedure described in relation to FIG. 5, the target SET 12 (e.g. the processor 30) may send a SUPL TRIGGERED START message to the H-SLP 16 instead of the SUPL START message to start a SUPL session for triggered or scheduled (e.g., periodic) location determination. The SUPL TRIGGERED START message may indicate information for periodic or area event triggering location determination. The H-SLP 16 (e.g. the processor 60) may be configured to respond to the SUPL TRIGGERED START message by producing and sending a SUPL TRIGGERED RESPONSE message instead of the SUPL RESPONSE message. The SUPL TRIGGERED RESPONSE message may contain the posmethod parameter (also referred to as a positioning method parameter) with the positioning protocol indicator which may be used in the same manner or in a similar manner to that described for the positioning protocol indicator in FIG. 5. Triggered or scheduled (e.g., periodic) location determination may also be established in a network initiated SUPL procedure similar that for the call flow 70 shown in FIG. 4, e.g., by the SET 12 responding to the SUPL INIT message by sending a SUPL TRIGGERED START message to the H-SLP 16 and with the H-SLP 16 responding with a SUPL TRIGGERED RESPONSE message which may include a posmethod parameter containing a positioning protocol indicator which may be used in the same or a similar manner to that described for the positioning protocol indicator in FIG. 4.

Figure 6:
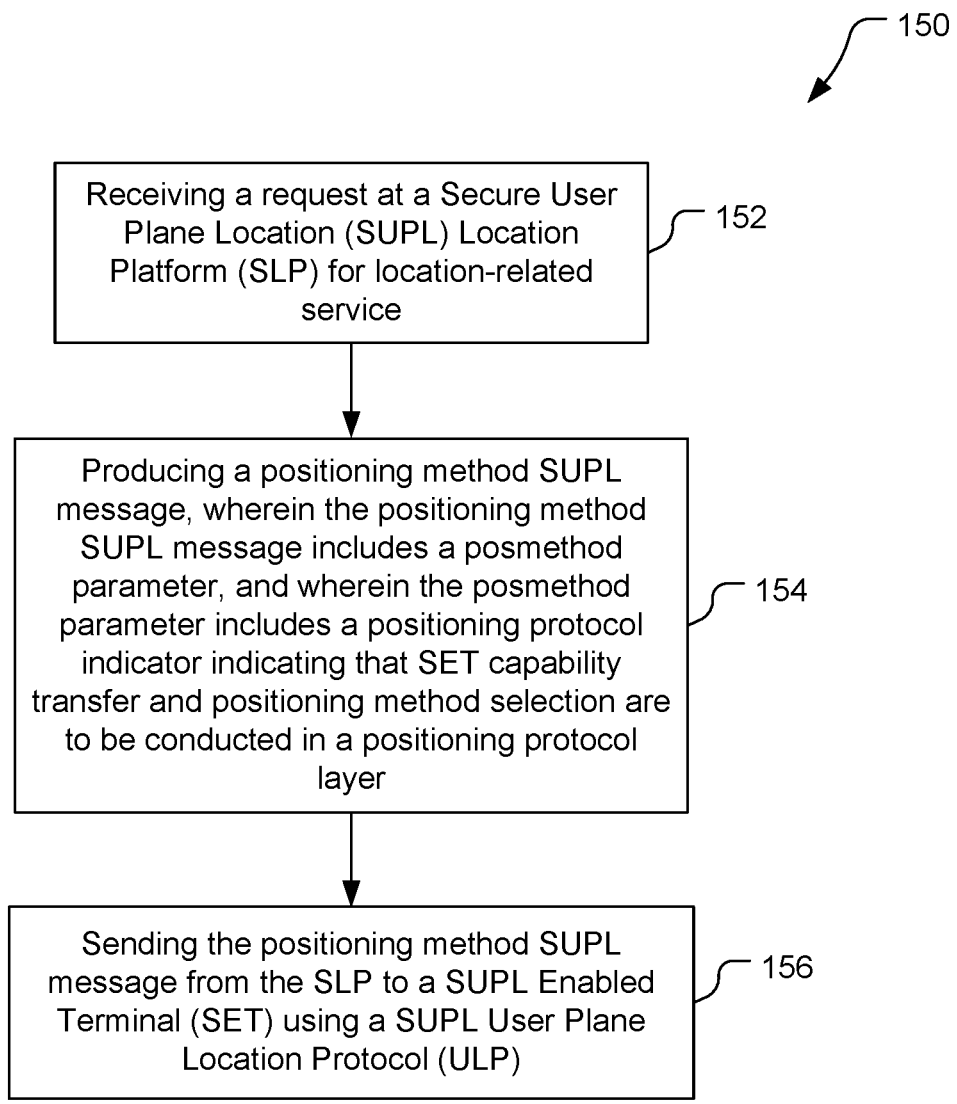
FIG. 6 is a block flow diagram of an embodiment of a method applicable at an SLP.

Referring to FIG. 6, with further reference to FIGS. 1-5, a method 150 of indicating that SET capability transfer and positioning method selection are to be conducted in a positioning protocol layer includes the stages shown. The method 150 is, however, an example only and not limiting. The method 150 may be altered, e.g., by having stages added, removed, rearranged, combined, performed concurrently, and/or having single stages split into multiple stages. The method 150 may be performed by an SLP—e.g. the H-SLP 16 or by some other type of SLP such as a Visited SLP (V-SLP), Discovered SLP (D-SLP) or Emergency SLP (E-SLP).

At stage 152, the method 150 includes receiving a request at an SLP for a location-related service. For example, if the SLP is H-SLP 16, the SUPL agent 28 may send a request for location-related service to the H-SLP 16 for network-initiated positioning (e.g., as at stage 72 in the call flow 70 shown in FIG. 4), or the target SET 12 may send a request to the H-SLP 16 for SET-initiated positioning (e.g., as at stage 114 in the call flow 110 shown in FIG. 5).

At stage 154, the method 150 includes producing a positioning method SUPL message, wherein the positioning method SUPL message includes a posmethod parameter, and wherein the posmethod parameter includes a positioning protocol indicator indicating that SET capability transfer and positioning method selection are to be conducted in a positioning protocol layer. The term "positioning method SUPL message" indicates that the SUPL message includes the posmethod parameter, and does not require that a positioning method (e.g., GNSS, GPS, etc.) be specified in the message, or that the message only includes the posmethod parameter. For example, the SLP produces a SUPL INIT message (e.g. as at stage 76 in the call flow 70) or a SUPL RESPONSE message (e.g. as at stage 118 in the call flow 110) or a SUPL TRIGGERED RESPONSE message containing a posmethod parameter, but unconventionally including a positioning protocol indicator in the posmethod parameter as opposed to an indication of a selected positioning method. The positioning protocol indicator may explicitly or implicitly indicate a positioning protocol (e.g. LPP, LPPe, RRLP, RRC or TIA-801) or a combination of positioning protocols (e.g. LPP/LPPe) to be used for determining the location of the target SET.

At stage 156, the method 150 includes sending the positioning method SUPL message from the SLP to a SET (e.g. the SET 12) using SUPL ULP. For example, the SLP (e.g. H-SLP 16) sends the SUPL INIT message (e.g. as at stage 76 in call flow 70), the SUPL RESPONSE message (e.g. as at stage 118 in call flow 110), or the SUPL TRIGGERED RESPONSE message to the target SET in the SUPL ULP layer with the message including the posmethod parameter including the positioning protocol indicator.

The method 150 may include one or more further features. For example, the method 150 may further include: receiving at the SLP a responsive SUPL ULP message from the SET responsive to the positioning method SUPL message, the responsive SUPL ULP message including SET capability information; and ignoring, by the SLP, the SET capability information in the responsive SUPL ULP message in response to sending the positioning method SUPL message including the posmethod parameter including the positioning protocol indicator. For example, the SET sends a SUPL POS INIT message to the SLP (e.g. as at stage 80 of the call flow 70 or stage 120 of the call flow 110) with SET capabilities. The SLP can ignore these provided SET capabilities, e.g., not act on the provided capabilities or at least not act on them to select a positioning method. Also or alternatively, the SLP may send a specified-data SUPL ULP message to the SET indicating specified data (e.g. a request for assistance data and/or positioning related measurements) that are to be transferred between the SLP and the SET in the positioning protocol layer only and not in the ULP layer. For example, the SLP may indicate that positioning data is only to be transferred in the positioning protocol layer. The specified-data SUPL message and the positioning method SUPL message may be the same message—e.g. may be sent as a single message at stage 156 (e.g., the SUPL INIT message or SUPL RESPONSE message or SUPL TRIGGERED RESPONSE message) and may indicate that SET capability transfer and positioning method selection are to be conducted in a positioning protocol layer and that specified data are only to be transferred between the SET and the SLP in the positioning protocol layer.

Figure 7:
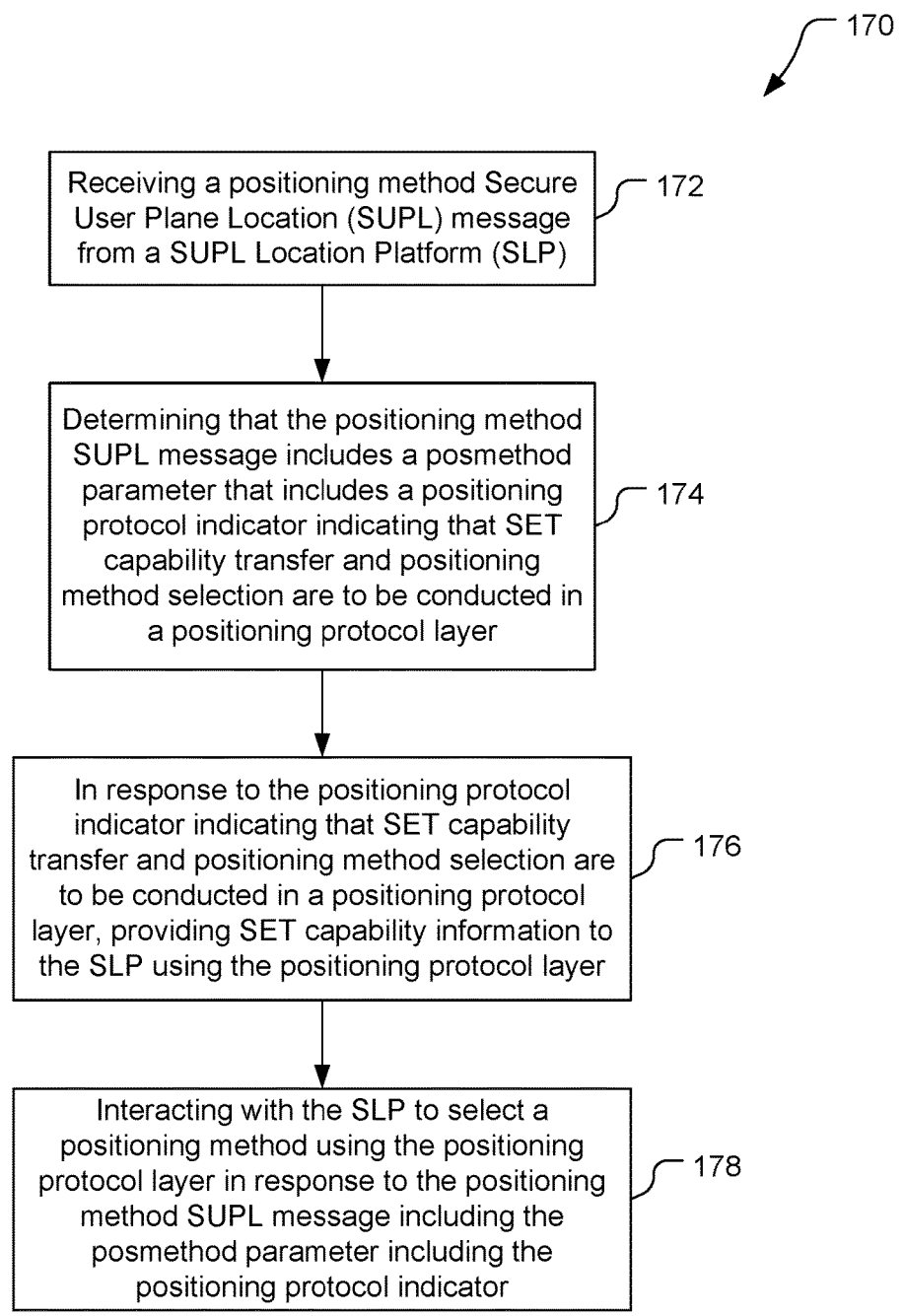
FIG. 7 is a block flow diagram of an embodiment of a method applicable at a SET.

Referring to FIG. 7, with further reference to FIGS. 1-5, a method 170 of selecting SET capability transfer and positioning method includes the stages shown. The method 170 is, however, an example only and not limiting. The method 170 may be altered, e.g., by having stages added, removed, rearranged, combined, performed concurrently, and/or having single stages split into multiple stages. The method 170 may be performed by a SET (e.g. the SET 12) or by a SUPL agent (e.g. the SUPL agent 22).

At stage 172, the method 170 includes receiving a positioning method SUPL message from an SLP (e.g. the H-SLP 16 or another SLP such as a D-SLP, V-SLP or E-SLP). For example, the H-SLP 16 may send the SUPL INIT message (e.g. as at stage 76 of call flow 70 shown in FIG. 4) or a SUPL TRIGGERED RESPONSE message for a network-initiated triggered or scheduled (e.g., periodic) positioning session, or the SUPL RESPONSE message (e.g. as at stage 118 of call flow 110 shown in FIG. 5) or a SUPL TRIGGERED RESPONSE message for a SET-initiated triggered or scheduled (e.g., periodic) positioning session, or another message.

At stage 174, the method 170 includes determining that the positioning method SUPL message includes a posmethod parameter that includes a positioning protocol indicator indicating that SET capability transfer and/or positioning method selection are to be conducted in a positioning protocol layer. For example, any of the SUPL INIT, SUPL RESPONSE, or SUPL TRIGGERED RESPONSE messages may include a posmethod parameter that normally indicates a positioning method to use to determine the location of the SET. At stage 174, however, the SET determines that the posmethod parameter included in the positioning method SUPL message includes a positioning protocol indicator indicating that SET capability transfer and/or positioning method selection are to be conducted in a positioning protocol layer. The positioning protocol indicator may also or instead explicitly or implicitly indicate a positioning protocol to be used for determining the location of the SET.

At stage 176, the method 170 includes in response to the positioning protocol indicator indicating that SET capability transfer and positioning method selection are to be conducted in a positioning protocol layer, providing SET capability information to the SLP using the positioning protocol layer. For example, the SET responds to the positioning method SUPL message including the posmethod parameter including the positioning protocol indicator by providing the SET capabilities (e.g., regarding supported positioning methods) using the positioning protocol layer that was explicitly or implicitly indicated by the positioning protocol indicator. The SET provides the SET capability information to the SLP in a positioning protocol message and embeds this message in a SUPL ULP message such as a SUPL POS INIT message (e.g., as at stage 80 of call flow 70 or stage 120 of call flow 110) or a SUPL POS message (e.g. as at stage 82 of call flow 70 or stage 122 of call flow 110).

At stage 178, the method 170 includes interacting with the SLP to select a positioning method using the positioning protocol layer in response to the positioning method SUPL message including the posmethod parameter including the positioning protocol indicator. For example, the SET communicates with the SLP (e.g. as at stage 80 and/or 82 of call flow 70 or stage 120 and/or 122 of call flow 110) to negotiate which positioning method (that may include one positioning method or a combination of positioning methods) to use to determine the location of the target SET. The location of the SET may be determined by the SET (SET-based positioning) or by the SLP (SET-assisted positioning). The positioning protocol may be LPP, LPP/LPPe, RRC, RRLP, TIA-801 or some other protocol and may be implicitly or explicitly indicated. With the positioning protocol implicitly indicated, the SET may use an implicitly-indicated protocol (e.g., if one protocol is implicitly indicated) or select a protocol (e.g., if multiple protocols are available and the implicit positioning protocol indication is a generic positioning protocol indication). With the positioning protocol indicator explicitly indicating the positioning protocol, the providing at stage 176 and the interacting at stage 178 may use the explicitly specified positioning protocol.

The method 170 may include one or more further features. For example, the method 170 may include receiving a specified-data SUPL message from the SLP indicating specified data (e.g. a request for assistance data and/or positioning related measurements) that are to be transferred between the SET and the SLP in the positioning protocol layer only—e.g. by sending the specified data to the SLP using only the positioning protocol layer in response to receiving the specified-data SUPL message. For example, the SET may receive an indication from the SLP that certain data, e.g., positioning data, are to be sent by the SET or the SLP only using the positioning protocol layer, e.g., with positioning protocol communications embedded in SUPL ULP communications. The specified-data SUPL message may be the same as the positioning method SUPL message, e.g., may be the SUPL INIT message, the SUPL RESPONSE message, or the SUPL TRIGGERED RESPONSE message.

Other Considerations

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

A description that an entity produces an item, such as a message, does not require the entity to generate the item from scratch. For example, to produce a message, an entity such as the H-SLP 16 or the target SET 12 may be configured to generate some or all of the message and/or to select and combine one or more previously-generated portions of the message, possibly with one or more generated portions of the message.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions.

The processes, systems, and devices discussed above are examples, and as such are not limiting of the claims or the invention(s) as a whole. Various configurations may omit, substitute, or add various procedures or components as appropriate. For instance, in alternative configurations, the processes may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A server comprising:
  a transceiver configured to send messages to a Secure User Plane Location (SUPL) Enabled Terminal (SET) and to receive messages from the SET; and
  a processor communicatively coupled to the transceiver and configured to send a positioning method SUPL message to the SET via the transceiver using a SUPL User Plane Location Protocol (ULP);
  wherein the positioning method SUPL message includes a posmethod parameter; and
  wherein the posmethod parameter includes a positioning protocol indicator indicating that SET capability transfer and positioning method selection are to be conducted in a positioning protocol layer.

2. The server of claim 1, wherein the processor is configured to respond to the processor sending the positioning method SUPL message with the positioning protocol indicator by ignoring SUPL ULP information from the SET indicating SET capability information.

3. The server of claim 1, wherein the processor is configured to send the positioning method SUPL message including the positioning protocol indicator as part of a SUPL INIT message, a SUPL RESPONSE message, or a SUPL TRIGGERED RESPONSE message.

4. The server of claim 1, wherein the processor is configured to send to the SET a specified-data SUPL message using SUPL ULP that indicates that specified data that are to be transferred between the server and the SET in the positioning protocol layer only.

5. The server of claim 4, wherein the specified data are positioning data.

6. The server of claim 4, wherein the processor is configured to send the positioning method SUPL message and the specified-data SUPL message in a single message.

7. The server of claim 1, wherein the positioning protocol indicator specifies a positioning protocol.

8. A method comprising:
  receiving a request at a Secure User Plane Location (SUPL) Location Platform (SLP) for location-related service;
  producing a positioning method SUPL message, wherein the positioning method SUPL message includes a posmethod parameter, and wherein the posmethod parameter includes a positioning protocol indicator indicating that SET capability transfer and positioning method selection are to be conducted in a positioning protocol layer; and
  sending the positioning method SUPL message from the SLP to a SUPL Enabled Terminal (SET) using a SUPL User Plane Location Protocol (ULP).

9. The method of claim 8, further comprising:
  receiving, at the SLP, a responsive SUPL ULP message from the SET responsive to the positioning method SUPL message, the responsive SUPL ULP message including SET capability information; and
  ignoring, by the SLP, the SET capability information in the responsive SUPL ULP message in response to sending the positioning method SUPL message including the posmethod parameter including the positioning protocol indicator.

10. The method of claim 8, wherein the positioning method SUPL message is one of a SUPL INIT message, a SUPL RESPONSE message, or a SUPL TRIGGERED RESPONSE message.

11. The method of claim 8, further comprising sending a specified-data SUPL message to the SET, using SUPL ULP, indicating specified data that are to be transferred between the SLP and the SET in the positioning protocol layer only.

12. The method of claim 11, wherein the specified data are positioning data.

13. The method of claim 11, wherein sending the positioning method SUPL message and sending the specified-data SUPL message comprise sending a single message.

14. The method of claim 8, wherein the positioning protocol indicator specifies a positioning protocol.

15. A Secure User Plane Location (SUPL) Enabled Terminal (SET) comprising:
  a transceiver configured to send messages to a SUPL Location Platform (SLP) and to receive messages from the SLP; and
  a processor communicatively coupled to the transceiver and configured to:
    receive a positioning method SUPL message, in a SUPL User Plane Location Protocol (ULP), from the SLP via the transceiver;

determine that the positioning method SUPL message includes a posmethod parameter that includes a positioning protocol indicator; and in response to the positioning protocol indicator indicating that SET capability transfer and positioning method selection are to be conducted in a positioning protocol layer:
provide SET capability information to the SLP using the positioning protocol layer; and
interact with the SLP to select a positioning method using the positioning protocol layer.

16. The SET of claim 15, wherein the positioning method SUPL message is one of a SUPL INIT message, a SUPL RESPONSE message, or a SUPL TRIGGERED RESPONSE message.

17. The SET of claim 15, wherein the processor is configured to:
receive a specified-data SUPL message from the SLP indicating specified data that are to be transferred from the SET to the SLP in the positioning protocol layer only; and
send the specified data to the SLP using only the positioning protocol layer in response to receiving the specified-data SUPL message.

18. The SET of claim 17, wherein the specified data are positioning data.

19. The SET of claim 17, wherein the processor is configured to receive the positioning method SUPL message and the specified-data SUPL message as a single message.

20. The SET of claim 15, wherein the positioning protocol indicator indicates a specified positioning protocol and the processor is configured to use the specified positioning protocol to provide the SET capability information to the SLP and to interact with the SLP to select the positioning method.

21. A method comprising:
receiving a positioning method Secure User Plane Location (SUPL) message from a SUPL Location Platform (SLP);
determining that the positioning method SUPL message includes a posmethod parameter that includes a positioning protocol indicator indicating that SET capability transfer and positioning method selection are to be conducted in a positioning protocol layer;
in response to the positioning protocol indicator indicating that SET capability transfer and positioning method selection are to be conducted in a positioning protocol layer, providing SET capability information to the SLP using the positioning protocol layer; and
interacting with the SLP to select a positioning method using the positioning protocol layer in response to the positioning method SUPL message including the posmethod parameter including the positioning protocol indicator.

22. The method of claim 21, wherein the positioning method SUPL message is one of a SUPL INIT message, a SUPL RESPONSE message, or a SUPL TRIGGERED RESPONSE message.

23. The method of claim 21, further comprising:
receiving a specified-data SUPL message from the SLP indicating specified data that are to be transferred from the SET to the SLP in the positioning protocol layer only; and
sending the specified data to the SLP using only the positioning protocol layer in response to receiving the specified-data SUPL message.

24. The method of claim 23, wherein the specified data are positioning data.

25. The method of claim 23, wherein receiving the positioning method SUPL message and the specified-data SUPL message comprise receiving a single message.

26. The method of claim 21, wherein the positioning protocol indicator indicates a specified positioning protocol and wherein providing the SET capability information to the SLP and interacting with the SLP to select the positioning method each comprise using the specified positioning protocol.

* * * * *